United States Patent [19]

Georges et al.

[11] Patent Number: 4,894,309
[45] Date of Patent: Jan. 16, 1990

[54] PROCESSES FOR THE PREPARATION OF CROSSLINKED COPOLYMERS

[75] Inventors: Michael K. Georges, Guelph; Lupu Alexandru, Toronto; William J. Dale, Scarborough; Paul D. Szabo, Weston, all of Canada; Robert A. Nelson, Webster, N.Y.

[73] Assignee: Xerox Corporation, Stamford, Conn.

[21] Appl. No.: 246,070

[22] Filed: Sep. 19, 1988

[51] Int. Cl.$^4$ ................................................ G03G 9/08
[52] U.S. Cl. ...................................... 430/137; 430/109
[58] Field of Search ......................... 430/137, 109, 111

[56] References Cited

U.S. PATENT DOCUMENTS

| | | | |
|---|---|---|---|
| Re. 31,072 | 11/1982 | Jadwin et al. | 430/99 |
| 3,627,708 | 12/1971 | Morse et al. | 260/2.5 B |
| 4,125,696 | 11/1978 | Kamath | 526/73 |
| 4,155,956 | 5/1979 | Ballova et al. | 260/880 R |
| 4,415,644 | 11/1983 | Tamaki et al. | 430/137 |
| 4,507,378 | 3/1985 | Wada et al. | 430/137 |
| 4,558,108 | 12/1985 | Alexandru et al. | 526/340 |
| 4,659,641 | 4/1987 | Mahalek et al. | 430/137 |
| 4,789,617 | 12/1988 | Arahara et al. | 430/137 |
| 4,804,610 | 2/1989 | Mori et al. | 430/137 |

Primary Examiner—John L. Goodrow
Attorney, Agent, or Firm—E. O. Palazzo

[57] ABSTRACT

A free radical suspension polymerization process for obtaining crosslinked styrene butadiene ternary copolymers which comprises the polymerization of styrene monomers, butadiene monomers, and crosslinking components in the presence of a surfactant, a stabilizer, and a first and second initiator; and wherein the aforementioned components are present in an aqueous phase; heating the resulting aqueous mixture at a temperature of from about 50° C. to about 110° C.; thereafter heating the mixture at a temperature of from about 110° C. to about 150° C.; followed by cooling and isolating the desired product.

11 Claims, No Drawings

PROCESSES FOR THE PREPARATION OF CROSSLINKED COPOLYMERS

BACKGROUND OF THE INVENTION

This invention is directed to processes for the preparation of crosslinked resins, and more specifically to processes for preparing crosslinked styrene butadiene copolymers by free radical suspension polymerization. Thus, in one embodiment of the present invention there is provided a process for the preparation of styrene/butadiene/divinylbenzene ternary copolymers, or other crosslinked polymers by suspension free radical polymerization processes, which terpolymers are obtained in high purity in an economical manner, and are useful for the incorporation into toner compositions. Additionally, the toner compositions formulated with the resins prepared in accordance with the process of the present invention possess enhanced elasticity, and substantial toughness characteristics, that is for example they do not degrade upon impaction from carrier particles. Developer compositions can be formulated by admixing the aforementioned toner compositions with carrier particles, and these developer compositions can be incorporated into electrophotographic imaging and printing processes wherein there is obtained images of excellent resolution and substantially no background deposits; and wherein the selection of release fluids and the accompanying costly apparatuses associated therewith are avoided.

Toner and developer compositions with styrene butadiene resins are well known. There are illustrated in U.S. Pat. No. 4,558,108, the disclosure of which is totally incorporated herein by reference, processes for preparing suspension polymerized styrene butadiene resins, which resins are useful as resin particles in toner composition. Additionally, in U.S. Pat. No. 4,469,770 there are illustrated toner compositions containing plasticized styrene butadiene resin particles, which particles are prepared by emulsion polymerization methods. Further, toner compositions with certain fusible crosslinked binder polymers are illustrated in U.S. Reissue Pat. No. 31,072, see column 7 for example.

In U.S. Pat. No. 4,507,378 there is illustrated a process for the preparation of toner compositions for electrophotography which involves polymerizing an aqueous suspension of a monomer such as styrene in the presence of a dispersant which includes a phosphate compound. According to the disclosure of this patent, once polymerization occurs the dispersant is removed by adding a dilute acid and a final product is obtained subsequent to rinsing with water. Additionally, in U.S. Pat. No. 4,155,956 there is disclosed a copolymer process wherein styrene and butadiene rubber are dissolved and heated in the presence of a plasticizer and a peroxide initiating component, followed by flushing the aforementioned mixture with nitrogen gas. Thereafter, the prepolymer solution is heated in an aqueous medium with tricalcium phosphate, disubstituted sodium alkyl sulfonates, calcium carbonate, and peroxide polymerization initiators. The graft copolymers of styrene and synthetic rubber results by prepolymerizing the rubber with styrene in bulk; thus, a preformed polymer is selected as contrasted to the present invention wherein there is obtained a ternary copolymer that is crosslinked by free radical polymerization techniques. Furthermore, in U.S. Pat. No. 4,659,641 there is illustrated a polymerization process for toner resin compositions, reference Example I, wherein a styrene n-butyl methacrylate copolymer with 2 percent wax is dispersed in water. A suspending agent, tricalcium phosphate, and a surfactant in a monomer solution are added to the initial mixture with a polymerization initiator such as benzyl peroxide. After polymerization occurs, nitric acid is added to remove the tricalcium phosphate and the final product is filtered, washed, and dried.

In U.S. Pat. No. 4,125,696 there is illustrated a polymerization process with ditertiary butyl diperoxy carbonate as a finishing catalyst. Specifically, in the free radical process described in this patent a vinyl monomer is polymerized at distinct high temperature stages in the presence of two free radical initiators; however, this patent appears to be silent with respect to the preparation of crosslinked materials, and also is concerned with bulk polymerizations. Additionally, in U.S. Pat. No. 3,627,708 there is illustrated a process for the formulation of macroporous crosslinked copolymers, which are formed by a free radical type polymerization of a mixture of monomers in water, which may include styrene, ethyl vinyl benzene, and divinylbenzene. Although this patent refers to suspension polymerization emulsion polymerization was believed to be intended as, for example, a surfactant solubilizer component selected at concentrations above the micelle concentration. Polymerization occurs within the aforementioned micelles. In the present invention, process suspension polymerization is accomplished in one embodiment, for example by the utilization of minor amounts of surfactant, 1 part surfactant to about 1,700 parts of monomer by weight, below the critical micelle concentration, thereby avoiding the formation of a micelle structure. Accordingly, with the process of the present invention, in one embodiment polymerization occurs directly in the monomer beads surrounded, for example, by tricalcium phosphate or other similar materials. Further, with the process of the present invention crosslinked products of high purity result. Moreover, in the '708, there is selected an inert polymer-insoluble and monomer phobic or monomer insoluble poreforming precipitant. These precipitants are normally not soluble within the monomer mixture, but are solubilized therein through the further addition of a micelle-forming compound that acts as a solubilizer for the precipitant and is itself soluble within the monomer mixture.

Although the above mentioned processes for preparing polymer particles useful in toner compositions are suitable for their intended purposes in most instances, there remains a need for other processes wherein there can be obtained products of high purity, that is for example 99 percent or greater. Also, there remains a need for the preparation of crosslinked copolymers of high purity with enhanced elasticity, that is the ability of the product of the present invention to stretch when a stress is applied to it, and the ability of the product material to return to its original form once the stress has been removed; enhanced toughness, acceptable minimum fuse temperatures of less than or equal to about 320° F., in some instances excellent (high) blocking temperature of about 125° F., and acceptable micronization rates of about 175 to about 200.

There is also a need for processes that enable the preparation of crosslinked ternary copolymers by suspension free radical polymerizations, and wherein the resulting product can be selected as resin particles in the formulation of toner compositions. Furthermore, there remains a need for an economical process for the preparation of crosslinked styrene butadiene divinylbenzene ternary polymers by a suspension free radical polymerization wherein the resulting product can be obtained economically and which process is readily scalable. Additionally, there is a need for processes for the preparation of crosslinked styrene butadiene divinylbenzene ternary copolymers by suspension free radical polymerizations, which polymers can be selected for the incorporation into toner compositions that are useful for the development of images in electrophotographic imaging apparatuses wherein offset preventing fluids such as silicone oils are avoided.

SUMMARY OF THE INVENTION

These and other needs of the present invention are accomplished by the provision of processes for the preparation of crosslinked styrene copolymers by suspension free radical polymerizations. More specifically, in one embodiment the present invention comprises a process for the preparation of crosslinked styrene-/butadiene/divinylbenzene ternary polymers comprising a suspension free radical polymerization in the presence of monomers, such as styrene, butadiene, and divinylbenzene, or other similar crosslinking components, and two initiators, one a low temperature and the second a high temperature initiator. Included in the reaction formulation is an ionic, water soluble surfactant and a monomer insoluble stabilizer. The polymerization is performed in two stages; during the first stage the bulk of the polymerization occurs at, for example, a temperature of from about 50° C. to about 110° C. In the second stage, there is included a high temperature initator to reduce the level of residual monomers to, for example, styrene with, for example, less than about 600 ppm to about 1,600 ppm, and for butadiene less than about 0.1 to about 8 ppm. The aforementioned second stage polymerization usually is accomplished at a higher temperature than the first polymerization, that is for example at a temperature of from about 115° to about 150° C., and preferably about 130° C. When the polymerization is completed, the polymer is washed with acid to remove the stabilizing agent, washed with deionized water, filtered, and dried. The product is isolated as solid, white beads of varying sizes.

More specifically, in one embodiment of the present invention there is provided a free radical suspension polymerization process for obtaining crosslinked styrene/butadiene ternary copolymers, which process comprises the polymerization of styrene and butadiene monomers in the presence of a surfactant and a crosslinking component, and in the presence of a first initiator and a second initiator; and wherein the aforementioned components are initially heated to a temperature of from about 50° C. to about 115° C. for an effective period of time, for example from about 2 to about 5 hours; followed by heating at a temperature, for example, of from about 110° C. to about 150° C. for a period of time of, for example, from about 15 minutes to about 2 hours. Thereafter, the resulting crosslinked product is isolated by, for example, washing with an acid, preferably nitric acid, followed by filtration, rinsing with water, and drying. In another embodiment of the present invention, there is provided a process for the preparation of crosslinked polymers of styrene and butadiene, which comprises providing an aqueous phase comprising an aqueous mixture comprising water, styrene monomer, butadiene monomer, a crosslinking component, a suspension stabilizing agent, a surfactant, a chain propagating amount of free radical polymerization initiator insoluble in water, soluble in said styrene monomer, soluble in said butadiene monomer and having a 1 hour half-life between about 50° C. and about 130° C., and a second initiator capable of reducing residual monomer levels to an acceptable level which is also soluble in said styrene monomer, soluble in said butadiene monomer but insoluble in water, the ratio of said styrene monomer and said butadiene monomer being between about 80:20 and about 95:5 by weight, the weight proportion of water to the combination of said styrene monomer and said butadiene monomer being between about 8:1 and about 2:1, said suspension stabilizing agent consisting essentially of a finely divided, difficult water soluble powder and a vapor phase comprising an inert gas and butadiene monomer; heating said aqueous phase and said vapor phase to a temperature between about 50° C. and about 130° C. at a pressure between about 20 psi and about 140 psi in the absence of redox initiators and mercaptan compounds; removing butadiene monomer from said vapor phase after at least about 75 percent by weight of said butadiene monomer and said styrene monomer in said aqueous phase are converted to a copolymer; and prior to conversion of more than about 98 percent by weight of said butadiene monomer and said styrene monomer to a copolymer in said aqueous phase; and heating said aqueous phase at a temperature between about 50° C. and about 130° C. at a pressure between about 20 psi and about 140 psi until at least about 90 percent by weight of said styrene monomer and said butadiene monomer are copolymerized to form an aqueous suspension of discrete copolymer particles having a Tg value of between about 45° C. and about 65° C., a weight average molecular weight of between about 10,000 and about 400,000, a molecular weight distribution of said copolymer between about 3 and about 40, and a butadiene monomer concentration of less than about 10 parts per million by weight; and wherein there is included in the reaction a crosslinking component thereby permitting a crosslinked resin.

Another embodiment of the present invention relates to a free radical suspension polymerization process for obtaining crosslinked styrene butadiene ternary copolymers which comprises the polymerization of styrene monomers, butadiene monomers and crosslinking components in the present of a surfactant, a stabilizer, a first and second initiator, and wherein the aforementioned components are present in an aqueous phase; heating the resulting aqueous mixture at a temperature of from about 50° C. to about 110° C.; thereafter heating the mixture at a temperature of from about 110° C. to about 150° C.; followed by cooling and isolating the desired product.

In a specific embodiment of the present invention, the process comprises the preparation of crosslinked styrene/butadiene/divinylbenzene terpolymers of a purity of 99 percent or greater by suspension free radical polymerization. Accordingly, for example, to a solution of an ionic surfactant from about 0.5 percent to 2.0 percent by weight, based on the suspension stabilizing agent in deionized water, is suspended a stabilizing agent, from about 1 percent to about 10 percent by weight based on the total weight of styrene and butadiene monomers. The resulting mixture is then added to a modified Parr Bomb and heated to a temperature of between about 50° C. and about 110° C. over a period of usually 40 minutes. Butadiene monomer, about 10 percent to about 20 percent by weight based on total weight of monomers, is distilled into a stainless steel cylinder. In a second stainless steel cylinder is added a solution of low temperature initiator, such as benzoyl peroxide, about 0.05 percent to about 6.5 percent by weight of initiator based on total weight of monomers, a high temperature initiator, such as O,O-t-butyl-O-2(ethylhexyl/monoperoxycarbonate), about 0.05 percent to about 0.5 percent by weight based on total weight of monomers, and a crosslinking agent, about 0.05 percent of about 0.5 percent by weight base on the total weight of monomers, in styrene, about 80 percent to about 90 percent by weight based on the total weight of monomers. The styrene monomer to crosslinking agent ratio is from about 99.9995:0.0005 to about 99.9925:0.0075 in one embodiment.

The low temperature initiator is one that has a 1 hour half-life between about 50° C. and about 110° C. The high temperature initiator is defined as one that has a 1 hour half-life between 115° C. and 130° C. Also, the low temperature initiator is responsible for the polymerization of the bulk of the monomers, greater than about 95 percent, and the high temperature initiator is selected primarily to reduce the level of residual monomers. The butadiene can then be transferred to the steel cylinder and the contents of the cylinder are transferred to the reaction vessel under a nitrogen pressure of between 50 psi and 80 psi. The reaction is allowed to continue at the selected temperature, between about 50° C. and about 110° C., for a selected period of time, between about 150 minutes to about 240 minutes, after which time the reaction mixture is heated to a second selected temperature, between 115° C. and 130° C., over a period of generally 40 minutes and held at this temperature for between 15 minutes and 90 minutes. Thereafter, the reaction mixture is cooled, washed with concentrated nitric acid (6 to 10 milliliters), filtered, washed with deionized water and dried under vacuum at 40° C. for generally between 10 to 20 hours.

In a specific preferred process embodiment of the present invention, there is charged into a reaction vessel deonized water, a stabilizing agent such as tricalcium phosphate, a surfactant such as Alcanol (Sodium Alkyl Naphthalene Sulfonate), styrene, butadiene, initiators such as benzoyl peroxide, O,O-t-butyl-O-(2-ethylhexyl) monoperoxycarbonate generally referred to as peroxyester high temperature initiators which serve to reduce residual monomers to an acceptable level, and a crosslinking agent, divinylbenzene. An aqueous phase is prepared in the aforementioned reactor by charging certain amounts of deionized water, dissolving a specific amount of an alcanol in a small amount of deionized water, suspending the tricalcium phosphate in this solution and then adding the mixture into the reactor, and sealing the reactor. Thereafter, the aqueous phase, which is comprised of a water phase and includes the materials dissolved in the water (the alcanol) as well as the materials suspended in it (the tricalcium phosphate) is mixed in the reactor by agitation, and the reactor is simultaneously heated to 95° C. and purged with nitrogen. The butadiene selected is distilled into a stainless steel cylinder, and an appropriate amount of benzoyl peroxide is weighed out and dissolved in a desired amount of styrene monomer. The high temperature initiator is then added and the resulting solution is transferred to a second stainless steel cylinder. The butadiene is subsequently transferred to the latter stainless steel cylinder. When the temperature of the water mixture in the reactor has reached 90° C., the monomer preparation, in the stainless steel cylinder, is transferred, under a nitrogen pressure, to the reactor. The polymerization is allowed to proceed at 90° C. for a specified time after which the reaction temperature is increased to 125° C. for a specified time. Subsequently, the reaction mixture is cooled, the product as solid beads is washed with nitric acid to remove the stabilizing agent, washed again with water, and dried.

Characteristics associated with the formed crosslinked polymer resins, and more particularly, the styrene/butadiene/divinylbenzene crosslinked ternary polymers, 87 percent by weight of styrene, 13 percent by weight of butadiene, obtained with the process of the present invention, and a ternary polymer with zero percent of divinyl benzene are as follows:

| Copolymer | % DBV | Tgo °C. | Tgm °C. | Ts °C. | MI * | MV ** | (n) *** | % Gel |
|---|---|---|---|---|---|---|---|---|
| Styrene/ Butadiene | 0.00 | 47.5 | 54.0 | 107.0 | 20.7 | 3.8 | 38.2 | 1.10 |
| Styrene/ Butadiene/ Divinylbenzene | 0.05 | 47.0 | 53.0 | 109.0 | 9.0 | 3.57 | 39.9 | 0.40 |
| Styrene/ Butadiene/ Divinylbenzene | 0.10 | 46.0 | 53.0 | 106.0 | xxx | 4.24 | 78.3 | 2.30 |
| Styrene/ Butadiene/ Divinylbenzene | 0.15 | 49.0 | 55.0 | 109.0 | xxx | xxx | xxx | 23.80 |
| Styrene/ Butadiene/ Divinylbenzene | 0.20 | 47.0 | 53.0 | xxx | xxx | xxx | xxx | 43.10 |
| Styrene/ Butadiene/ Divinylbenzene | 0.30 | 48.0 | 54.0 | 117.0 | xxx | xxx | xxx | 61.80 |
| Styrene/ Butadiene/ Divinylbenzene | 0.50 | 49.0 | 56.0 | 118.5 | xxx | xxx | xxx | 76.10 |

\* = gm/10 min
\*\* = poise × 10³, temperature approximately 150° C., frequency 30.1 rad/sec
\*\*\* = ml/gm
% DVB = percent divinylbenzene relative to other monomers present
Tgo = glass transition onset temperature (measured on a Dupont DSC)
Tgm = Glass transition median temperature for Tgo
TS = softening temperature (measured on a Dupont 943 thermomechanical analyzer)
MI = melt index (measured at 150° C. with a weight of 2.2 Kg)
MV = melt vicosity (measured with a Rheometrics Mechanical Spectrometer 800.
(n) = intrinsic viscosity
% Gel = percent insoluble polymer
xxx = indicates property is not measurable for that sample due to inadequate flow (MI, MV) or insolubility of polymer (n).

The following plot demonstrates the relationship between the gel content of a ternary copolymer of the present invention and the amount of crosslinking agent divinylbenzene (DVB), wherein W equals weight.

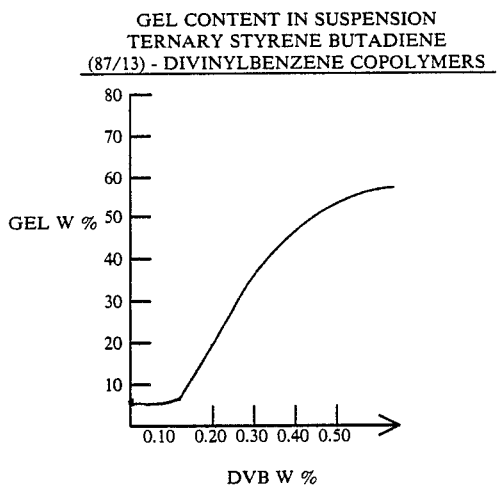

GEL CONTENT IN SUSPENSION
TERNARY STYRENE BUTADIENE
(87/13) - DIVINYLBENZENE COPOLYMERS

In an important embodiment of the present invention, there is provided a process for forming a crosslinked copolymer of styrene and butadiene by providing an aqueous phase comprising an aqueous mixture comprising water, styrene monomer, butadiene monomer, a suspension stabilizing agent, a chain propagating amount of free radical polymerization initiator insoluble in water, soluble in said styrene monomer, soluble in said butadiene monomer and having a 1 hour half life between about 50° C. and about 130° C., and a chaser initiator capable of reducing residual monomer levels to an acceptable level, which is also soluble in said styrene monomer, soluble in said butadiene monomer but insoluble in water, the ratio of said styrene monomer, and said butadiene monomer being between about 80:20 and about 95:5 by weight, the monomer being between about 80:20 and about 95:5 by weight, the weight proportion of water to the combination of said styrene monomer and said butadiene monomer is between about 8:1 and about 2:1, said suspension stabilizing agent consisting essentially of a finely-divided, difficultly water soluble powder, or substantially water insoluble powder, and a vapor phase comprising an inert gas and butadiene monomer, heating said aqueous phase and said vapor phase to a temperature between about 50° C. and about 130° C. at a pressure between about 20 psi and about 140 psi in the absence of redox initiators and mercaptan compounds, removing butadiene monomer from said vapor phase after at least about 75 percent by weight of said butadiene monomer and said styrene monomer in said aqueous phase are converted to a copolymer and prior to conversion of more than about 98 percent by weight of said butadiene monomer and said styrene monomer to a copolymer in said aqueous phase, and heating said aqueous phase at a temperature between about 50° C. and about 130° C. at a pressure between about 20 psi and about 140 psi until at least about 90 percent by weight of said styrene monomer and said butadiene monomer are copolymerized to form an aqueous suspension of discrete copolymer particles having a Tg value of between about 45° C. and about 65° C., a weight average molecular weight of between about 10,000 and about 400,000, a molecular weight distribution of said copolymer between about 3 and about 40 and a butadiene monomer concentration of less than about 10 parts per million by weight; and wherein there is included in the reaction a crosslinking component such as divinyl benzene.

With further reference to the process of the present invention, generally the reactants are heated with styrene; followed by subsequent heating to a higher temperature; followed by cooling the reaction mixture; and separating the crosslinked ternary copolymer product therefrom. This product can optionally be washed with acid, and thereafter the mixture is filtered to remove any unwanted materials such as water and subsequently the desired crosslinked product is dried.

Illustrative examples, present in effective appropriate amounts, of the monomers that may be selected for the process of the present invention include styrene, butadiene, isoprene, α-methylstyrene, vinyltoluene, ethylstyrene, monochlorostyrene, dichlorostyrene, alkoxystyrenes, and the like. Initiator examples include lauroyl peroxide, benzoyl peroxide, acetyl peroxide, decanoyl peroxide, azobisisobutyronitrile, O,O-t-butyl-O(2-ethylhexyl) monoperoxycarbonate, O,O-t-amyl-O(2-ethylhexyl) monoperoxycarbonate, peroxydicarbonates, and the like. Examples of stabilizing agents are tricalcium phosphate, barium phosphate, zinc phosphate, magnesium phosphate, bentonite, talc, and the like; while surfactants include sodium alkyl naphthalene sulfonate (Alkanol SC), sodium oleate, dodecylbenzene sodium sulfonate, sodium tetradecyl sulfate, and the like. Crosslinking components include divinylbenzene, and the like, reference Reissue U.S. Pat. No. 31,072, the disclosure of which is totally incorporated herein by reference.

Toner formulations can then be prepared by adding the crosslinked polymers prepared in accordance with the process of the present invention to toner resin particles, such as styrene butadiene copolymers, reference U.S. Pat. No. 4,560,635, the disclosure of which is totally incorporated herein by reference, pigment particles and optional charge enhancing additives, followed by melt blending and mechanical attrition. More specifically, toner compositions can be formulated which are comprised of the crosslinked styrene resins of the present invention, pigment particles, a low molecular weight wax component, and an optional charge enhancing additive selected from the group consisting of alkyl pyridinium halides, reference U.S. Pat. No. 4,298,672, the disclosure of which is totally incorporated herein by reference; organic sulfates, and sulfonates, especially stearylphenyl dimethyl ammonium tosylate, reference U.S. Pat. No. 4,338,390, the disclosure of which is totally incorporated herein by reference; and distearyl dimethyl ammonium methyl sulfate, reference U.S. Pat. No. 4,560,635, the disclosure of which is totally incorporated herein by reference. Many of these additives and the toner compositions resulting are illustrated in copending application Ser. No. 045,641 entitled Positively Charged Toner Compositions, the disclosure of which is totally incorporated herein by reference.

Numerous well known suitable pigments or dyes can be selected as the colorant for the toner particles including, for example, carbon black, nigrosine dye, lamp black, iron oxides, magnetites, and mixtures thereof. The pigment, which is preferably carbon black, should be present in a sufficient amount to render the toner composition highly colored. Thus, the pigment particles are present in amounts of from about 3 percent by weight to about 20 percent by weight, based on the total weight of the toner composition; however, lesser or greater amounts of pigment particles can be selected providing the objectives of the present invention are achieved.

Various magnetites, which are comprised of a mixture of iron oxides, in most situations including those commercially available such as Mapico Black, can be selected for incorporation into the toner compositions illustrated herein. The aforementioned pigment particles are present in various effective amounts, however, generally they are present in the toner composition in an amount of from about 15 percent by weight to about 25 percent by weight, and preferably in an amount of from about 16 percent by weight to about 19 percent by weight. Other magnetites not specifically disclosed herein may be selected provided the objectives of the present invention are achievable. Other magnetites can be selected for the toner and developer compositions of the present invention including brown magnetites, and magnetites commercially available as MO-4232 and 4235.

Colored pigment particles that may be incorporated into the toner compositions of the present invention are cyan, magenta, yellow, red, blue, brown and green. These pigments are generally present in the toner composition in an amount of from about 2 weight percent to about 15 weight percent based on the weight of the toner resin particles.

Illustrative examples of magenta, cyan and yellow pigments, or colorants selected for the toner compositions of the present invention are well known including, for example, the magenta compounds 2,9-dimethyl-substituted quinacridone and anthraquinone dye identified in the Color Index as CI 60710; CI Dispersed Red 15, a diazo dye identified in the Color Index as CI 16050; CI Solvent Red 19; and the like. Examples of cyan materials that may be used as pigments include copper tetra-4(octadecyl sulfonamido) phthalocyanine; X-copper phthalocyanine pigment listed in the Color Index as CI 74160; CI Pigment Blue; and Anthrathrene Blue, identified in the Color Index as CI 69810; Special Blue X-2137; and the like; while illustrative examples of yellow pigments that may be selected include diarylide yellow 3,3-dichlorobenzidene acetoacetanilides; a monazo pigment identified in the Color Index as CI 12700; CI Solvent Yellow 16; a nitrophenyl amine sulfonamide identified in the Color Index as Foron Yellow Se/GLN; CI Dispersed Yellow 33, 2,5-dimethoxy-4-sulfonanilide phenylazo-4'-chloro-2,5-dimethoxy aceto-acetanilide; and Permanent Yellow FGL.

Waxy substances that may be incorporated into the toner composition generally have a molecular weight of from between about 500 to about 20,000, and preferably is of a molecular weight of from about 1,000 to about 6,000. Illustrative examples of low molecular weight waxy materials included within the scope of the present invention are polyethylenes, commercially available from Allied Chemical and Petrolite Corporation; Epolene N-15, commercially available from Eastman Chemical Products, Inc.; Viscol 550P, a low molecular weight polypropylene, available from Sanyo Kasei K. K.; and the like. The commercially available polyethylenes selected have a molecular weight of from about 1,000 to about 2,000, while the commercially available polypropylenes incorporated into the toner compositions of the present invention are of a molecular weight of about 4,000 to about 6,000. Many of the polyethylene and polypropylene compositions useful in the present invention are illustrated in British Pat. No. 1,442,835, the disclosure of which is totally incorporated herein by reference.

Further, the aforementioned low molecular weight wax materials can be incorporated into the toner compositions in various amounts; however, generally these waxes are present in an amount from about 1 percent by weight to about 10 percent by weight, and preferably are present in an amount of from about 2 percent by weight to about 5 percent by weight. The blended charge enhancing additives are present in an amount of from about 0.5 percent to about 20 percent by weight, and preferably from about 1 percent by weight to about 5 percent by weight based on the total weight of the toner particles. Other amounts of waxes, and charge enhancing additives can be selected providing the objectives of the present invention are achievable.

Formulation of developers comprises admixing with the aforementioned toner composition carrier particles that will enable the toner particles to become positively charged. Accordingly, as carrier cores there can be selected steel, nickel, iron ferrites and the like, with coatings thereover of fluoropolymers, such as polyvinylidene fluoride, copolymers of tetrafluoroethylenes and vinyl chloride; mixtures of fluoropolymers and polymethyl methacrylates; and the like. Specific examples of carriers that may be selected for the invention of the present application are illustrated in U.S. Ser. Nos. 751,922, 136,792, and 136,791, the disclosures of which are totally incorporated herein by reference. Additionally, there can be selected nickel berry carriers as described in U.S. Pat. Nos. 3,847,604 and 3,767,598, the disclosures of which are totally incorporated herein by reference. The diameter of the coated carrier particles is from about 50 microns to about 1,000 microns thus permitting the carrier particles to possess sufficient density and inertia to avoid adherence to the electrostatic images during the development process. Also, usually the carrier coating weight is from about 0.2 to about 3 weight percent.

The carrier particles are mixed with the toner composition in various suitable combinations, however, best results are obtained with from about 1 part by weight to about 3 parts by weight of toner particles with from about 100 parts to 200 parts by weight of carrier particles.

As indicated herein, the toner and developer compositions of the present invention are very useful for developing electrostatic latent images and colored images, particularly those present on imaging members charged negatively. When selecting the developing compositions of the present invention, it is not necessary to utilize a release fluid, such as a silicone oil, to prevent toner offset since the compositions of the present invention prevent toner offset without a toner release fluid. Moreover, with respect to the toner compositions containing magnetites therein, there are enabled smudgeproof images and substantially no machine contamination when these compositions are incorporated into xerographic imaging apparatuses.

Examples of imaging that may be selected include various known photoreceptor compositions, particularly those which are negatively charged, which usually occurs with organic photoreceptors including layered photoreceptors. Illustrative examples of layered photoresponsive devices are comprised of a generating layer and a transport layer as described in U.S. Pat. No. 4,265,990, the disclosure of which is totally incorporated herein by reference. Examples of generating pigments are trigonal selenium, metal phthalocyanines, metal free phthalocyanines, and vanadyl phthalocyanines. Transport materials that may be selected include various aryl diamines dispersed in resinous binders.

The imaging method of the present invention thus involves the formation of a negatively charged electrostatic latent image on a suitable imaging member; contacting the image with the toner compositions of the present invention wherein the toner particles contain resin particles, pigment particles, a charge enhancing additive and a low molecular weight wax; followed by transferring the developed colored image to a suitable substrate such as paper; and permanently affixing the image thereto by various suitable means such as heat.

The following examples are being supplied to further define specific embodiments of the present invention, it being noted that these examples are intended to illustrate and not limit the scope of the present invention. Parts and percentages are by weight unless otherwise indicated.

EXAMPLE I

Laboratory Synthesis of the Crosslinked Styrene/Butadiene Copolymer

Water, 70 milliliters, was added to a modified mini-Parr reactor. The reactor was closed and heated. When the temperature reached 35° C., a slurry of tricalcium phosphate (3.25 grams) in a solution of Alkanol (39 milligrams) in water (30 milliliters) was added. The temperature was increased to 90° C. over a period of 45 minutes while the reaction vessel was flushed with nitrogen gas. A solution of styrene (28.0 grams), butadiene (8.70 grams), 55 percent divinylbenzene (0.59 grams), benzoyl peroxide (1.83 grams) (first initiator) and TBEC (O,O-t-butyl-O(2ethylhexyl)monoperoxycarbonate, (0.22 milliliters), second initiator was added under pressure over a period of 16 minutes resulting in a final pressure in the reaction vessel of approximately 60 psi. The reaction was allowed to proceed at 90° C. for 3.5 hours after which it was vented and purged with nitrogen (4 times) to reduce the level of unreacted residual monomers, heated to 125° C. over 40 minutes, held at 125° C. for 1 hour and then cooled to room temperature. Concentrated nitric acid (8.0 milliliters) was added and the mixture was stirred for 10 minutes. The terpolymer product was filtered off, washed with water (approximately 1,500 milliliters) and dried overnight at 40° C. under vacuum. The first initiator reacts during the 95° C. heating plateau, and the second initiator reacts during 125° C. heating plateau.

The resulting copolymer had the following properties: Tg=56° C., Ts=118.5° C., and 76.1 percent gel.

EXAMPLE II

0.3 Percent Crosslinking Agent

The process of Example I was repeated with the exceptions that 0.3 percent divinylbenzene was selected, that is 0.355 gram of 55 percent divinylbenzene. The resulting crosslinked terpolymer had the following properties: Tg=54° C.; Ts=117° C.; and 61.8 percent gel.

EXAMPLE III

0.15 Percent Crosslinking Agent

The procedure described in Example I was repeated with 0.177 gram, 55 percent divinylbenzene. The resulting terpolymer had the following properties: Tg=55° C., Ts=109° C. and 23.8 percent gel.

EXAMPLE IV

0.1 Percent Crosslinking Agent

The procedure described in Example I was repeated with 0.118 milligram, 55 percent divinylbenzene. The resulting terpolymer had the following properties: Tg=53° C., Ts=106° C., melt viscosity=4.24 poise×10³ at 150° C. and a frequency of 30 rad./sec., intrinsic viscosity 78.3 ml/gm and 2.3 percent gel.

With respect to the aforementioned examples, the modified mini-Parr reactor was purchased from Parr Instrument Co. Model 4561 with modifications to the reactor head configuration to allow for the introduction of the monomers. In addition, the reactor was fitted with an oil jacket for heating which also contains a cooling coil. Ts is the softening temperature and it was determined, by standard procedure on a Dupont 943 Thermomechanical Analyzer.

The gel content was determined by the following procedure. A sample of the product terpolymer, between 80 and 130 milligrams, was weighed directly into a glass centrifuge tube (120 millimeters by 20 millimeters). Toluene (25 millimeters) was added, and the sample was placed on a shaker overnight. After approximately 16 hours, the sample was centrifuged at 2,500 RPM for 30 minutes and then a 5 milliliters Aliquot was carefully removed and placed into a preweighed aluminum dish (65 millimeters by 15 millimeters). The toluene was allowed to air evaporate (usually takes about 2 hours). Thereafter, the sample was further dried at 60° C., under vacuum, for at least 6 hours or to constant weight. The amount of sample remaining, multiplied by five, provides the amount of soluble polymer and from this number the amount of Gel can easily be calculated, which indicates the amount of polymer present, that is not soluble in the solvent selected.

Three toner compositions were prepared by melt blending, followed by mechanical extrusion, micronization, and classification, which toner compositions were comprised of 19 percent by weight of the styrene butadiene divinylbenzene ternary copolymer of Example I, 57 percent by weight of a suspension polymerized styrene butadiene (87/13) with the first toner composition containing a terpolymer with 0.05 percent by weight of divinylbenzene; the second toner composition containing a terpolymer with 0.10 percent by weight of divinylbenzene; and the third toner composition containing a terpolymer with 0.15 percent by weight of divinylbenzene, 16 percent of Mapico magnetite, 4 percent of Regal 330 ® carbon black, 3 percent of low molecular weight polypropylene wax available from Sanyo Corporation as 660P (molecular weight of about 5,000), and 1 percent by weight of the charge enhancing additive distearyl dimethyl ammonium methyl sulfate. These three toners had the following characteristics:

| Toners | Melt Fusing Temperature (°F.) | Tribo (μc/gm) | Jetting Rate | $T_B$ (°F.) | Cost (Resin) $/Pound |
|---|---|---|---|---|---|
| 1 | 320 to 330 | +37 | 174 | 125 | 0.65 |
| 2 | 310 | +35 | 187 | 125 | 0.65 |
| 3 | 320 | +35 | 197 | 125 | 0.65 |

A similar toner composition with the exception that it contained 19 percent of crosslinked styrene n-butyl methacrylate resin with 0.2 percent of divinylbenzene had the following characteristics:

| Melt Fusing Temperature (°F.) | Tribo (μc/gm) | Jetting Rate | $T_B$ (°F.) | Cost (Resin) $/Pound |
|---|---|---|---|---|
| 322 to 328 | +43 | 203 | 120 to 125 | 1.00 |

With reference to the above characteristics, melt fusing temperature was the minimum fusing temperature determined in a fuser test fixture with no silicone oil therein at nominal set conditions (LIM silicone soft roll, 11 inches/second, 5.4 percent creep). The melt fusing temperature number selected was derived subsequent to fixing the toner to a paper substrate and utilizing a table abraser. The tribo (triboelectric charging value) in microcoulombs per gram was determined by preparing a developer composition comprised of 3 percent by weight of the above prepared toner compositions and 97 percent by weight of carrier particles containing a steel core with a coating thereover of polyvinylidene fluoride, 0.6 percent coating weight, and thereafter utilizing a Faraday Cage apparatus and standard blow off test processes. Jetting rate is the relative rate at which the toner can be micronized to a particular size, the smaller the number the faster the jetting rate, and therefore the lower the cost to obtain the toner. $T_B$ is the blocking temperature of the toner as determined by the open cup blocking method (ASTM). Additionally, the cost of the resin reported herein is estimated based upon the known process unit operations required to prepare the resin.

Other modifications of the present invention may occur to those skilled in the art subsequent to a review of the present application and these modifications are intended to be included within the scope of the present invention.

What is claimed is:

1. A toner composition comprised of the resin particles of crosslinked styrene butadiene ternary copolymers prepared by a free radical suspension polymerization process which comprises the polymerization of styrene monomers, butadiene monomers, and crosslinked components in the presence of a surfactant, a stabilizer, and a first and second initiator; and wherein the aforementioned components are present in an aqueous phase; heating the resulting aqueous mixture at a temperature of from about 50° C. to about 110° C. thereafter heating the mixture at a temperature of from about 110° C. to about 150° C.; followed by cooling; and isolating the desired product, second toner resin particles, pigment particles, a low molecular weight wax component, and a charge enhancing additive.

2. A toner composition in accordance with claim 1 wherein the wax is selected from the group consisting of polyethylene and polypropylene with a weight average molecular weight of from about 1,000 to about 6,000.

3. A toner composition in accordance with claim 1 wherein the pigment particles are selected from the group consisting of carbon black, magnetite, and mixtures thereof.

4. A toner composition in accordance with claim 1 wherein the charge enhancing additive is selected from the group consisting of alkyl pyridinium halides, stearyl phenethyl dimethyl ammonium methyl tosylate, and distearyl dimethyl ammonium methyl sulfate.

5. A toner composition in accordance with claim 1 wherein there is selected as resin particles a crosslinked styrene butadiene divinylbenzene ternary copolymer.

6. A toner composition in accordance with claim 5 wherein the copolymer has a gel content of from about 0.1 percent, to about 80 percent, a number average molecular weight of from about 15,000 to about 100,000, a weight average molecular weight of from about 100,000 to about 3,000,000, and Mw to Mn ratio of from about 3 to about 50.

7. A process for preparing a toner composition which comprises:
   a. forming a crosslinked styrene butadiene ternary copolymer by admixing styrene monomers, butadiene monomers, and crosslinking components in the presence of a surfactant, a stabilizer, and first and second initiators in an aqueous phase, heating the resulting aqueous mixture at a temperature of from about 50° C. to about 110° C., thereafter heating the mixture at a temperature of from about 110° C. to about 150° C., cooling the mixture, and isolating the resulting crosslinked styrene butadiene ternary copolymer product;
   b. admixing the crosslinked styrene butadiene ternary copolymer with toner resin particles, pigment particles, a low molecular weight wax, and a charge enhancing additive;
   c. subjecting the resulting mixture to melt blending and mechanical attrition; and
   d. micronizing and classifying the resulting material to obtain toner particles.

8. A process according to claim 7 wherein the crosslinked styrene butadiene ternary copolymer is prepared by heating the reaction mixture at from about 50° C. to about 110° C. for a period of from about 2 to about 5 hours, and subsequently heating the reaction mixture at from about 115° C. to about 150° C. for a period of from about 15 minutes to about 2 hours.

9. A process according to claim 7 wherein the ratio of styrene monomer to butadiene monomer is from about 80:20 to about 95:5 by weight, respectively.

10. A process according to claim 7 wherein the monomer to aqueous phase ratio is from about 45:55 to about 30:70 by weight.

11. A process according to claim 7 wherein the first initiator initiates the suspension free radical polymerization reaction and the second initiator reduces the amounts of residual monomers, resulting in a styrene content of less than 1,600 parts per million and a butadiene content of less than 10 parts per million.

* * * * *